INVENTORS
LORNE J. BELCHER
ROBERT G. RINKUS
BY
Donald G. Dalton
ATTORNEY

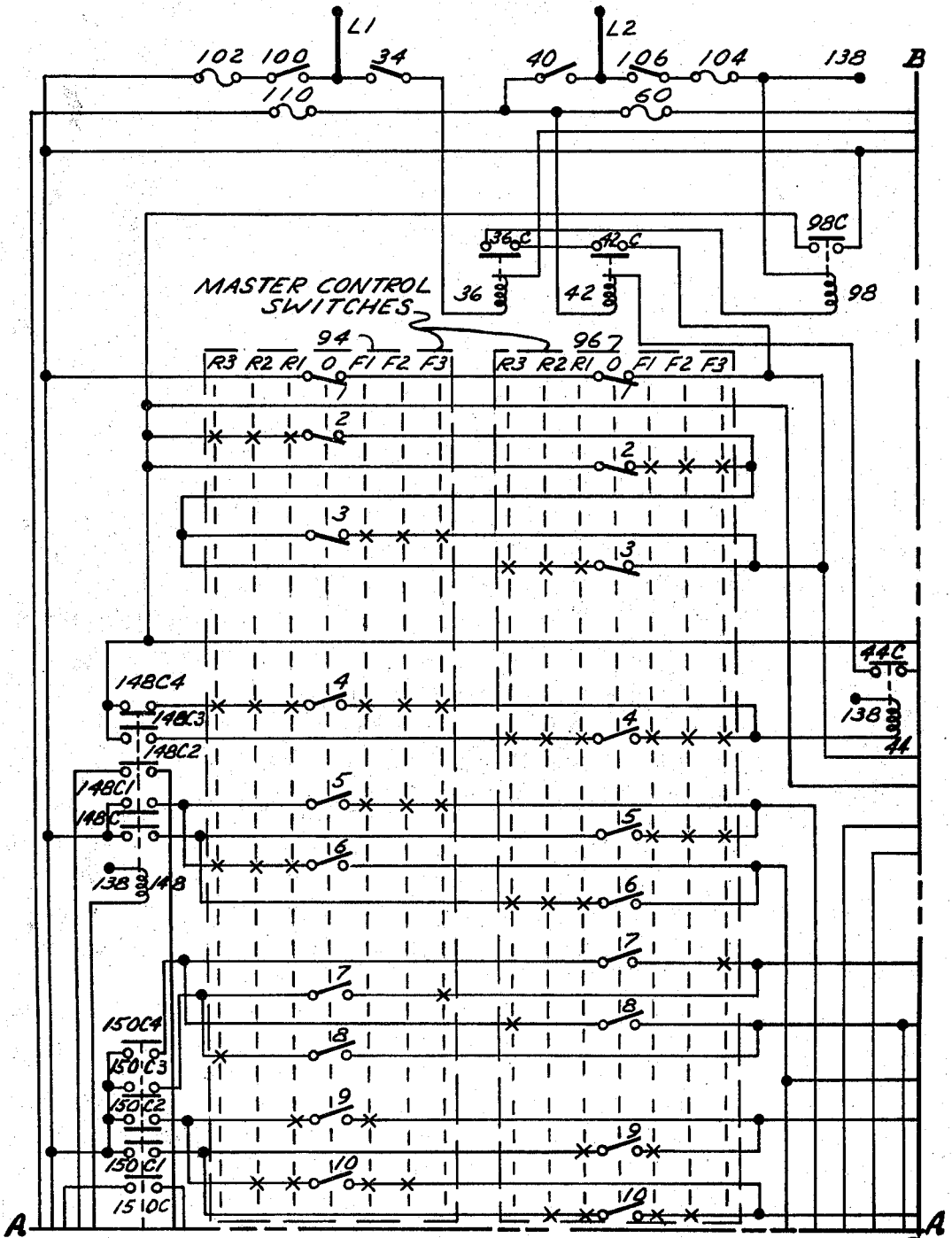

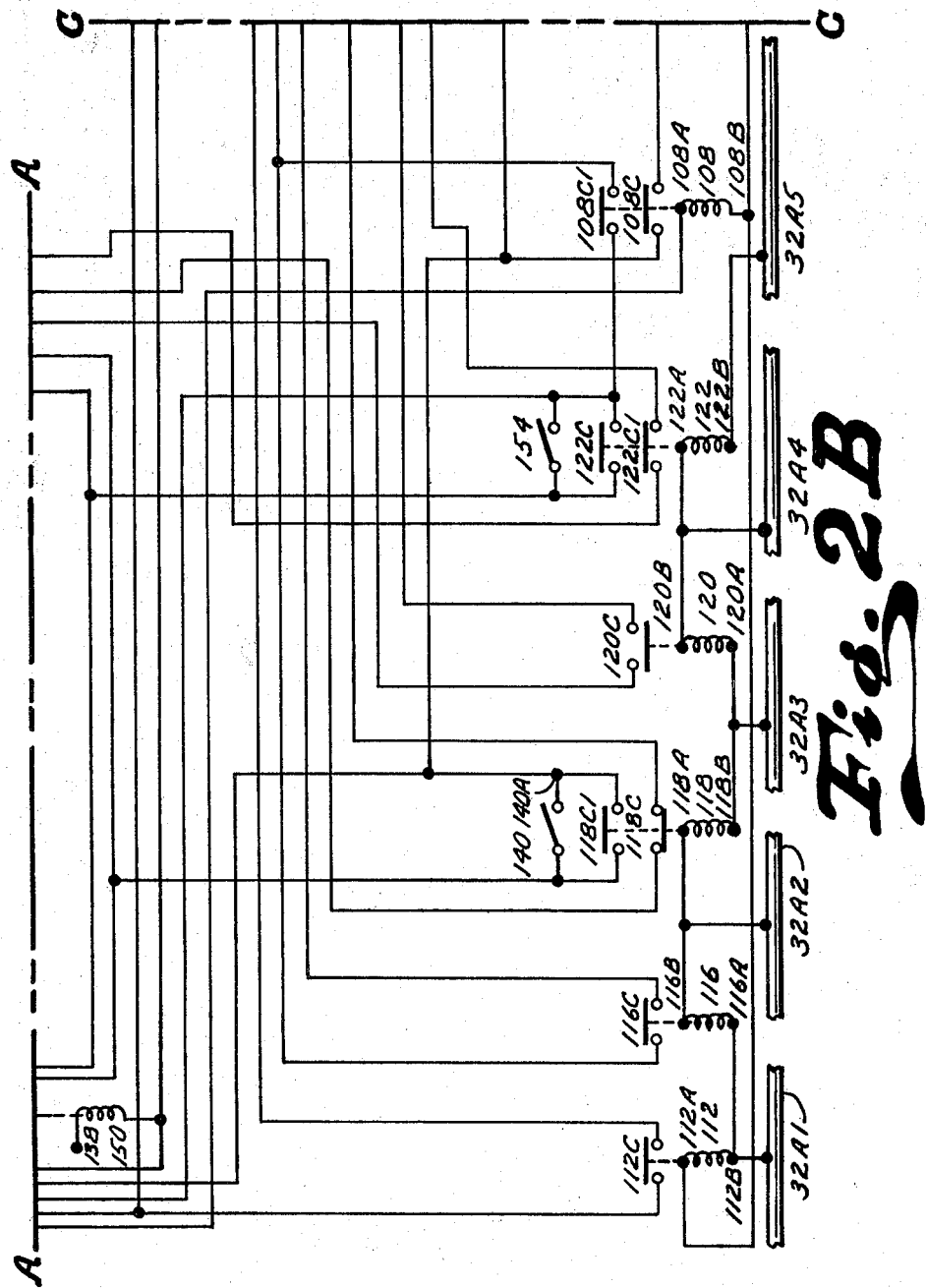

United States Patent Office 3,476,889
Patented Nov. 4, 1969

3,476,889
CONTROL SYSTEM FOR AUTOMOTIVE CAR
Lorne J. Belcher and Robert G. Rinkus, Lower Makefield Township, Bucks County, Pa., assignors to United States Steel Corporation, a corporation of Delaware
Filed Sept. 28, 1967, Ser. No. 671,444
Int. Cl. B60l 1/00, 9/00; B61b 13/00
U.S. Cl. 191—6                                    12 Claims

ABSTRACT OF THE DISCLOSURE

An electric motor operated transfer car is powered and remotely controlled through collector rails and shoes. Car movement is accomplished by an electric controller system connected to a segmented collector rail. Current sensitive control relays are connected to the rail segments in series with the motor shunt field providing position intelligence and a fail-safe control system over the braking, acceleration, deceleration and movement of the car.

---

This invention relates to a control system for a transfer car and more particularly to a fail-safe system for position control of the transfer car.

The movement of products away from a high production steel rolling mill, such as a slab mill, requires a reliable means of conveyance. The electrical control scheme for such a production movement system must be fail-safe in order to avoid serious damage if a control component fails. Delays resulting from such failures in auxiliary equipment supporting a high production primary rolling mill are very costly and must be kept to a minimum.

Electrical motor operated transfer cars are frequently used to move slabs away from a slab mill and are connected to a power supply by means of collector rails and shoes. The car can be remotely controlled and stopped automatically by position intelligence obtained either from wayside hatchway type limit switches actuated mechanically by an arm extending from the transfer car, or by proximity switches, or by voltage sensitive relays operating from a segmented control rail.

However, such control of a transfer car by means of hatchway limit switches or proximity switches is not reliable and requires a great deal of maintenance and the control does not provide a fail-safe system. Where a conventional direct current motor is used, voltage sensitive relays applied on a segmented control rail would require an additional rail and the electrical inter-locking becomes complicated enough to reduce the reliability of the system.

According to our invention, current sensitive control relays are connected to the segments of a control rail in series with a transfer car drive motor shunt field and are sequentially operated as the transfer car moves along its track. The manner in which the current relays are connected initiates acceleration, decelertaion and stopping of the car in a fail-safe manner.

It is therefore an object of our invention to provide a highly reliable control system for a transfer car.

Another object is to provide a position intelligence system to control a transfer car.

Still another object is to provide a fail-safe control system for a transfer car.

Figure 1:
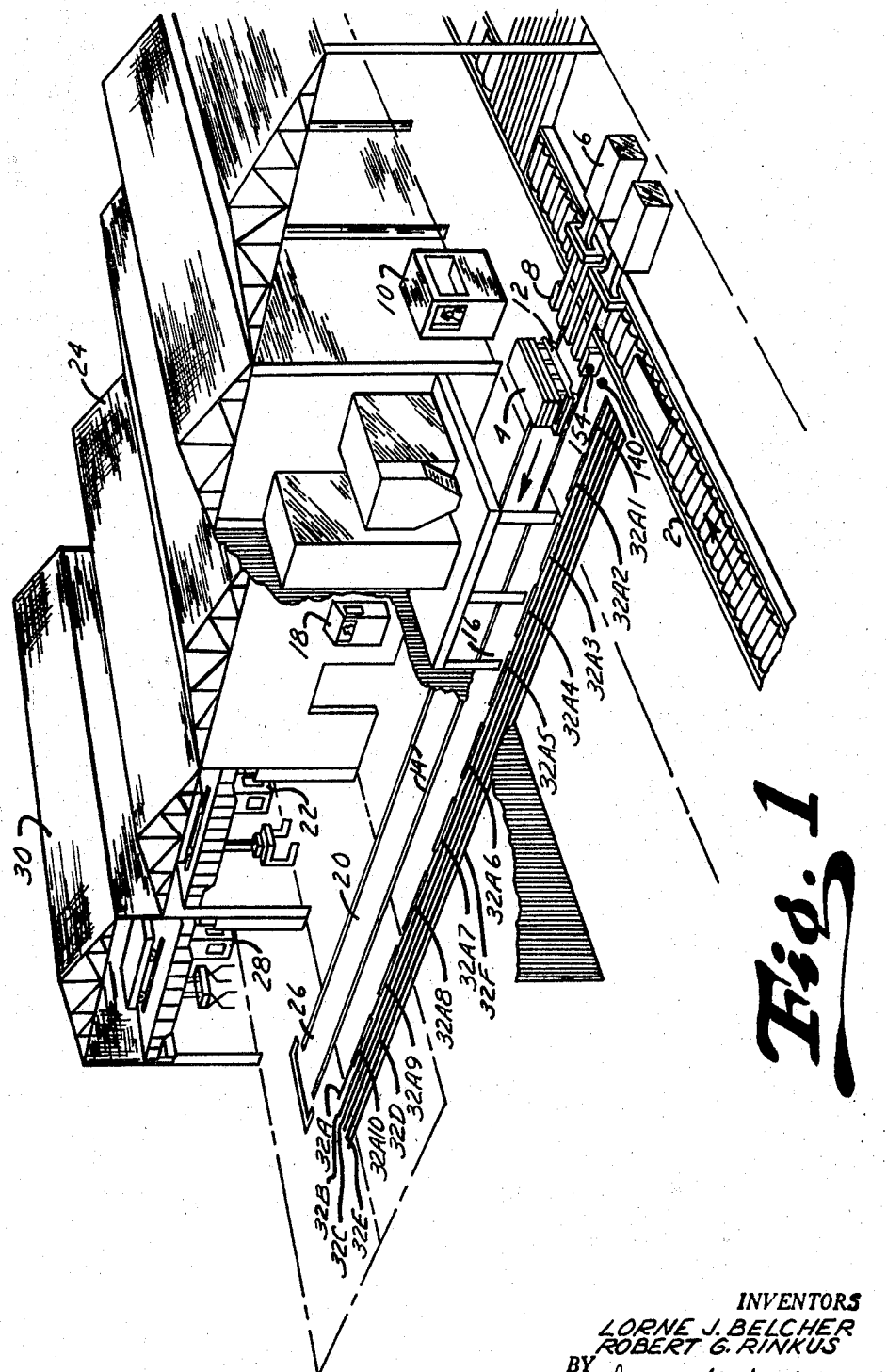
Figure 2A:
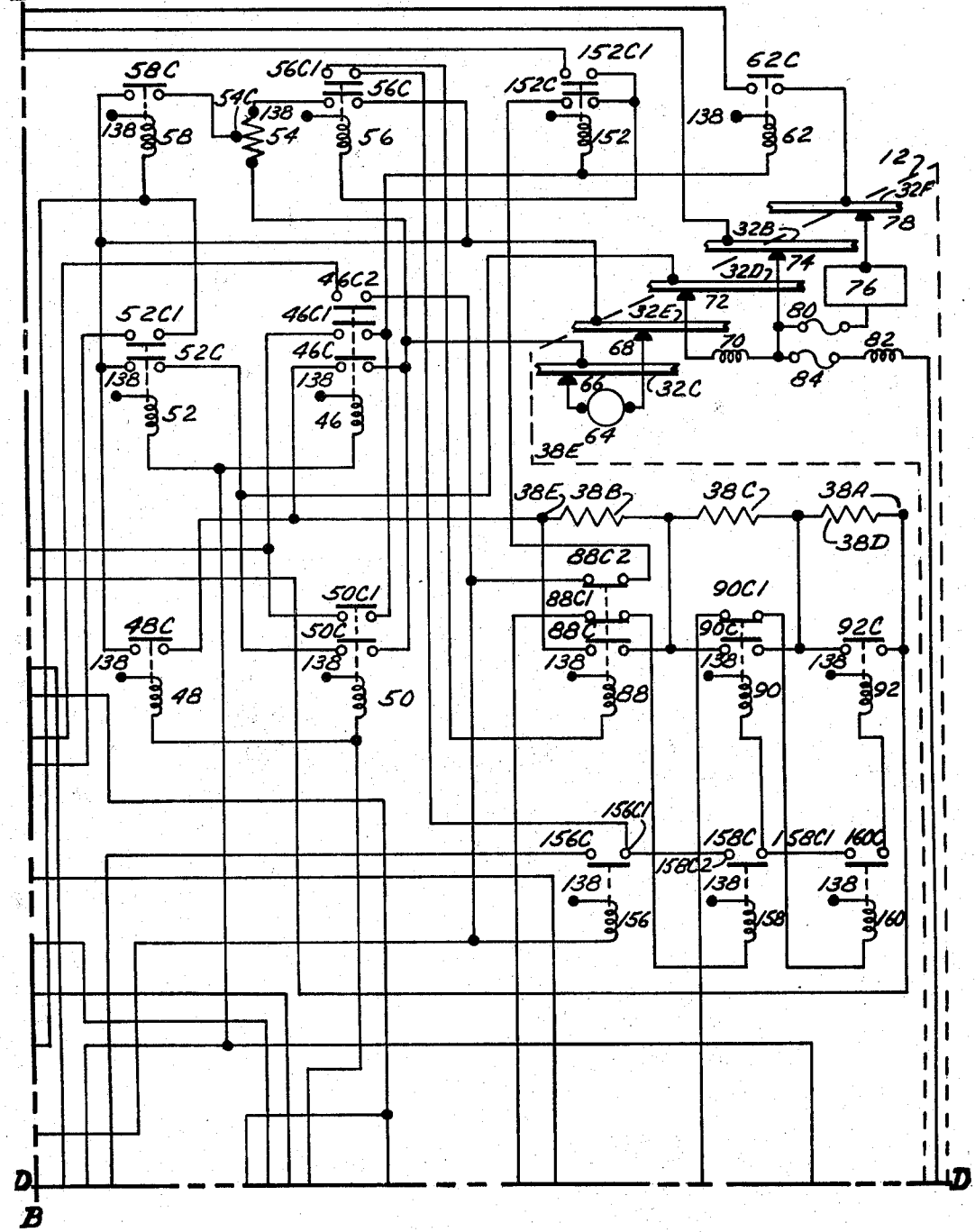
Figure 2C:
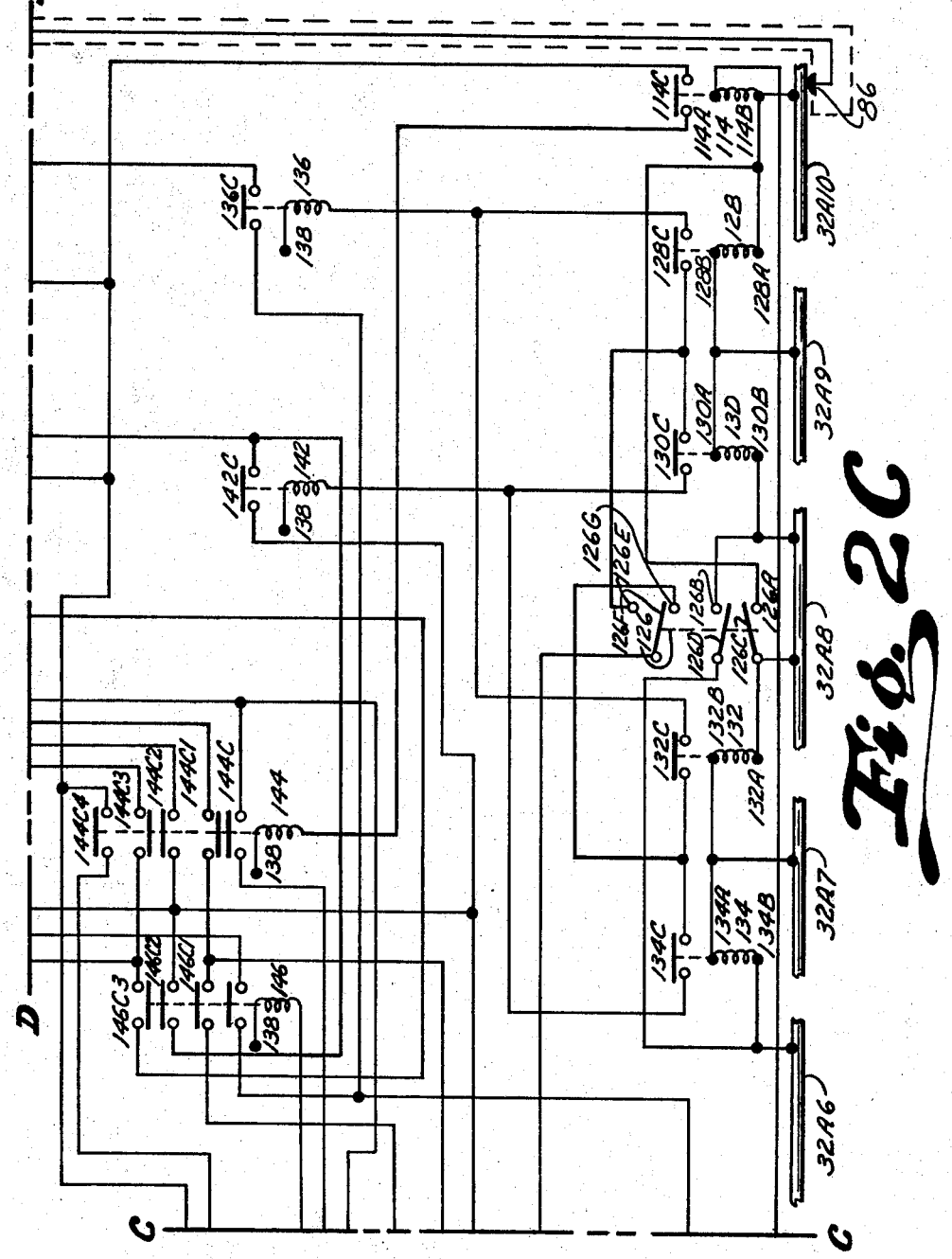

These and other objects will be more apparent after referring to the following specification and attached drawings, in which:

FIGURE 1 is a schematic view of a steel slab transfer system using a transfer car; and FIGURES 2, 2A, 2B and 2C, when connected on lines A—A, B—B, C—C and D—D constitute a schematic wiring diagram of the fail-safe control system for the transfer car.

Referring now to FIGURE 1 of the drawings, reference numeral 2 indicates an exit conveyor of a steel slab mill (not shown). Slabs 4 are pushed off the conveyor by a pusher 6 onto a piler 8 by a first operator at a control station 10. A transfer car 12 is positioned under the piler 8. When the desired number of slabs has been accumulated on the piler 8 the first operator lowers the pile of slabs onto the transfer car 12. The operator then moves the car along rails 14 to location 16 along the track, the limit of the first operator's vision and control. At this location a second operator at a second station 18 assumes control of the car. The car then moves to position 20 to be unloaded by crane 22 into a first storage yard 24 or, depending on the storage yard selected by the first operator, to position 26 to be unloaded by crane 28 into a second storage yard 30. The transfer car 12 is controlled through a segmented collector rail 32A and powered (source not shown) through collector rails 32B, 32C, 32D, 32E and 32F. Rail 32 has ten isolated segments 32A1, 32A2, 32A3, 32A4, 32A5, 32A6, 32A7, 32A8, 32A9 and 32A10. This represents a conventional transfer car installation which is controlled by our fail-safe control system.

Referring now to the details of our control system in FIGURES 2, 2A, 2B and 2C, reference characters L1 and L2 represent a source of direct current power for the transfer car 12. L1 is connected to collector rail 32B through switch 34 and a first overload relay coil 36. L2 is connected to a first termianl 38A of accelerating resistances 38B, 38C and 38D, connected in series, through a switch 40, a second overload relay coil 42, and normally open contacts 44C of a main contactor relay 44. Relays 36 and 42 may be Clark form LT2 relays manufactured by General Electric Company. A second termianl 38E of resistance 38B, 38C and 38D is connected to collector rail 32C through normally open contacts 46C of a first forward relay 46 and to collector rail 32E through normally open contacts 48C of a first reverse relay 48. Collector rail 32C is connected to collector rail 32D through normally open contacts 50C of a second reverse relay 50. Collector rail 32D is connected to collector rail 32E through normally open contacts 52C of a second forward relay 52. Collector rail 32C is connected to collector rail 32E through a dynamic brake resistor 54 and normally open contacts 56C of a first dynamic brake relay 56. Collector rail 32E is connected to a center tap 54C of dynamic brake resistor 54 through normally open contacts 58C of a second dynamic brake relay 58. Terminal L2 is connected to collector rail 32F through fuse 60 and normally open contacts 62C of a first brake relay 62.

Mounted on the transfer car 12 is a motor armature 64 connected across collector rails 32C and 32E by cellector shoes 66 and 68. A motor series field 70 is connected across collector rails 32B and 32D by collector shoes 72 and 74. A shunt brake solenoid 76 is connected in series with a fuse 80 across collector rails 32B and 32F by collector shoes 74 and 78. A motor shunt field 82 is connected in series with fuse 84 across collector rails 32A and 32B by collector shoes 74 and 86. The motor may be a conventional 150 horsepower, 250 volt direct current compound wound motor equipped with a spring loaded, solenoid released, shunt brake.

Accelerating resistance 38B is shunted by normally open contacts 88C of a first accelerating relay 88. Accelerating resistance 38C is shunted by normally open contacts 90C of a second accelerating relay 90. Accelerating resistance 38D is shunted by normally open contacts 92C of a third accelerating relay 92.

At station 10 there is a 10 pole master control switch 94. The master switch 94 (FIGURE 2) has an off position, O, a first forward position F1, a second forward position F2 and a third forward position F3, a first reverse position R1, and second reverse position R2, a third reverse position R3, and 10 poles identified at the off position.

At station 18 there is a similar master control switch 96 (FIGURE 2), with reverse positions R1, R2, R3, forward positions F1, F2, F3, off positions O and 10 poles identified at the off position.

An undervoltage relay coil 98 has one end connected to L1 through normally closed contacts 42C and 36C, normally closed first pole master switch contact 96–O, normally closed first pole master switch contact 94–O, a fuse 102, and a switch 100. Relay 98 may be a Type CR–2820–1054–AL7 manufactured by General Electric Company.

A field loss relay coil 108 has a first terminal 108A connected to L2 through a fuse 110 and switch 40, and a second terminal 108B connected to a first terminal 112A of a first transfer relay coil 112 and a first terminal 114A of a second transfer relay coil 114. A second terminal 112B is connected to segmented rail 32A1 and a first terminal 116A of a reverse stop relay coil 116. A second terminal 116B of reverse stop relay coil 116 is connected to collector rail segment 32A2 and to a first terminal 118A of a first reverse slow down relay coil 118. A second terminal 118B is connected to collector rail segment 32A3 and to a first terminal 120A of a second reverse slow lown relay coil 120. A second terminal 120B is connected to collector rail segment 32A4 and a first terminal 122A of a third reverse slow down relay coil 122. A second terminal 122B is connected to collector rail segment 32A5.

Relay 112 may be a Type IC–2820–A–100–BE–202–AF, and relay 114 may be a Type IC–2820–A–100–BE–202–J, both manufactured by the General Electric Company.

A second terminal 114B of transfer relay coil 114 is connected to collector rail segment 32A10, a first terminal 126A of a yard selector switch 126, and a first terminal 128A of a first forward stop relay coil 128. A second terminal 128B is connected to collector rail segment 32A9 and a first terminal 130A of first forward slow down relay coil 130. A second terminal 130B is connected to collector rail segment 32A8 and a second terminal 126B of switch 126. A first terminal 132A of a second forward step relay coil 132 is connected to collector rail segment 32A8 and to a first blade 126C of switch 126. A second terminal 132B is connected to collector rail segment 32A7 and a first terminal 134A of a second forward slow down relay coil 134. A second terminal 134B is connected to collector rail segment 32A6 and a second blade 126D of switch 126. Relays 108, 116, 118, 120, 122, 128, 130, 132, and 134 may be current sensitive relays Model IC–2820–A–100–BB–40–J manufactured by General Electric Company.

A common relay terminal 138 is connected to L2 through fuse 104 and switch 106. One end of a third forward stop relay coil 136 is connected to 138, and the other end is connected to a first terminal 140A of a first piler limit switch 140 through normally open contacts 128C, a third contact 126E of switch 126, and a third blade 126F of switch 126. The other end of coil 136 is also connected to contact 140A through normally open contacts 132C, a fourth contact 126G of switch 126 and blade 126F of switch 126. One end of a third forward slow down relay coil 142 is connected to terminal 138, and the other end is connected to terminal 140A through normally open contacts 130C, contact 126E of switch 126 and blade 126F of switch 126. The other end of relay coil 142 is also connected to contact 140A through normally open contacts 134C, contacts 126G of switch 126 and blade 126F of switch 126. Relays 136 and 142 may be Model No. IC–2820–A–100–BB–4–E manufactured by General Electric Company.

One end of a third transfer relay coil 144 is connected to terminal 138 and the other end is connected to L1 through normally open contacts 114C, fuse 102 and switch 100. One end of a fourth transfer relay coil 146 is connected to terminal 138, and the other end is connected to L1 through normally open contacts 112C of transfer relay 112, fuse 102 and switch 100. Relay 144 may be a Type IC–2820–A–100–BE–202–AF and relay 146 may be a Type IC–2820–A–100–BE–202–J, both manufactured by the General Electric Company. Relays 144 and 146 have a time delay of about ½ second before contacts are actuated after the relay coil is energized.

One end of a first selector control relay coil 148 is connected to terminal 138. One end of a second selector control relay coil 150 is connected to terminal 138. The other end of coil 148 and the other end of coil 150 are connected to L2 through normally open contacts 144C4, fuse 102 and switch 100. One end of relay coil 62 is connected to terminal 138. One end of a second shunt brake relay coil 152 is connected to terminal 138. The other end of coil 62 and the other end of coil 152 are connected to L1 through normally open contact 46C1 in parallel with normally open contacts 50C1, normally open contacts 98C, fuse 102 and switch 100. Relays 44, 46, 48, 50, 52, 56, 58, 62, 88, 90, 92 and 152 may be Model CR–2800–1170–BS–2 manufactured by General Electric Company. Relay 148 and 150 may be Model IC–2820–A–100–BB–4–BD manufactured by General Electric Company. The other end of coil 98 is also connected to L1 through normally closed contacts 36C, 42C, normally closed contacts 146C3, contacts 98C, fuse 102 and switch 100. The other end of coil 98 is also connected to L1 through contacts 36C, 42C, normally closed contacts 144C3, contacts 98C, fuse 102 and switch 100. The other end of coil 98 is also connected to L1 through contacts 42C, 36C, first pole master switch contacts 96–O, first pole master switch contacts 94–O, fuse 102 and switch 100. The other end of coil 98 is also connected to terminal L1 through contacts 36C, 42C, third pole master switch contacts 96R1, R2, R3, in parallel with third pole master switch contacts 94F1, F2, F3, second pole master switch contacts 96F1, F2, F3, in parallel with second pole master switch contacts 94R1, R2, R3, contacts 98C, fuse 102 and switch 100.

One end of relay coil 44 is connected to terminal 138 and the other end is connected to terminal L1 through fourth pole master switch contacts 96F1, F2, F3, 96R1, R2, R3, contacts 148C3, contacts 98C, fuse 102 and switch 100. The other end of relay coil 44 is also connected to L1 through fourth pole master switch contacts 94F1, F2, F3, 94R1, R2, R3, normally closed contacts 148C4, contacts 98C, fuse 102 and switch 100.

One end of relay coil 52 is connected to terminal 138, and the other end is connected to L1 through normally open contacts 136C, normally open contacts 108C, piler limit switch 140, fifth pole master switch contacts 96F1, F2, F3, normally open contacts 148C, fuse 102 and switch 100. The other end of relay coil 52 is also connected to L1 through normally open contacts 136C, normally open contacts 108C, piler limit switch 140, fifth pole master switch contacts 94F1, F2, F3, normally closed contact 148C1, fuse 102 and switch 100. Normally open contacts 146C1 are connected across normally open contacts 136C.

One end of first forward relay coil 46 is connected to terminal 138, and the other end is connected to the other end of relay coil 52.

One end of first reverse relay coil 48 is connected to terminal 138, and the other end is connected to L1 through normally open contacts 144C, normally open contacts 108C1, a second limit piler switch 154, sixth pole master switch contacts 96R1, R2, R3, normally open contact 148C, fuse 102 and switch 100. The other end of relay coil 48 is also connected to L1 through normally open contacts 144C, normally open contacts 108C1, second limit piler switch 154, sixth pole master switch contacts R4R1, R2, R3, normally closed contacts 148C1, fuse 102 and switch 100. Normally open contact 116C is connected across normally open contacts 144C. Normally open contacts 118C1 are connected across first limit piler switch 140, and normally open contacts 122C are connected across second limit piler switch 154. Normally open contacts 148C2 are connected across first limit piler switch 140, and normally open contacts 150C1 are connected across second limit piler switch 154. One end of second reverse relay coil 50 is connected to terminal 138, and the other end is connected to the other end of relay coil 48.

One end of accelerating relay coil 88 is connected to terminal 138, and the other end is connected to L1 through normally closed contacts 56C1, a first terminal 156C1 of a normally closed contact 156C, normally closed contacts 156C of a fourth accelerating relay 156, normally open contacts 142C, seventh pole master switch contacts 96F3, normally open contact 150C4, fuse 102 and switch 100. The other end of relay coil 88 is also connected to L1 through contacts 56C1, terminal 156C1, contacts 156C, contacts 142C, seventh pole master switch contacts 94F3, normally open contacts 150C3, fuse 102 and switch 100. Normally open contacts 146C2 are connected across normally open contacts 142C.

The other end of relay coil 88 is also connected to L1 through contacts 56C1, terminal 156C1, contacts 156C, normally open contacts 144C2, eighth pole master switch contact 96R3, contacts 150C4, fuse 102 and switch 100. The other end of relay coil 88 is also connected to L1 through contact 56C1, terminal 156C1, contact 156C, contact 144C2, eighth pole master switch contact 94R3, contact 150C3, fuse 102 and switch 100. Normally open contacts 122C1 are connected across normally open contacts 144C2.

One end of a second accelerating relay coil 90 is connected to terminal 138, and the other end is connected to a first terminal 158C1 of a normally closed contact 158C of a fifth accelerating relay 158. A second terminal 158C2 of a normally closed contact 158C is connected to terminal 156C1.

One end of a third accelerating relay coil 92 is connected to terminal 138, and the other end is connected to terminal 158C1 through a normally closed contact 160C of a sixth accelerating relay coil 160.

One end of a dynamic braking relay coil 58 is connected to terminal 138, and the other end is connected to L1 through ninth pole master switch contacts 94F1 and 94R1, normally closed contacts 150C2, fuse 102 and switch 100. The other end of coil 58 is also connected to L1 through contacts and ninth pole master switch contact 96F1 and 96R1, normally open contact 150C1, fuse 102 and switch 100. The other end of coil 58 is also connected to L1 through normally closed contact 52C1, normally closed contact 118C, normally open contact 146C1, normally closed contact 144C1, sixth pole master switch contacts 94R1, R2, R3, normally closed contact 148C1, fuse 102 and switch 100. The other end of coil 58 is also connected to L1 through normally closed contact 52C1, normally closed contact 118C, normally open contact 146C1, normally closed contact 144C1, sixth pole master switch contacts 96R1, R2, R3, normally open contact 148C, fuse 102 and switch 100. One end of a second accelerating relay coil 156 is connected to terminal 138, and the other end is connected to tenth pole master switch contact points 96F1, F2 and 96R1, R2, contact 150C1, fuse 102 and switch 100. The other end of coil 156 is also connected to L1 through tenth pole master switch contacts 94F1, F2 and 94R1, R2, contact 150C2, fuse 102 and switch 100.

The other end of coil 156 is also connected to terminal L1 through normally closed contacts 46C2, normally closed contacts 120C, normally closed contacts 14C1, sixth pole position master switch contacts 96R1, R2, R3, contacts 148C, fuse 102 and switch 100. The other end of coil 156 is also connected to terminal L1 through normally closed contacts 46C2, normally closed contacts 120C, normally closed contacts 144C1, sixth pole master switch contacts 94R1, R2, R3, contacts 148C1, fuse 102 and switch 100.

One end of second dynamic brake relay coil 56 is connected to terminal 138, and the other end is connected to L1 through normally open contacts 152C, normally closed contacts 88C2, tenth pole main switch contacts 96F1, F2, 96R1, R2, contacts 150C1, fuse 102 and switch 100. The other end of coil 56 is also connected to L1 through normally open contacts 152C, contacts 88C2, tenth pole master switch contacts 94F1, F2, 94R1, R2, contacts 150C2, fuse 102 and switch 100. The other end of coil 56 is also connected to L1 through normally closed contacts 152C1, fuse 102 and switch 100.

One end of fourth accelerating relay coil 158 is connected to terminal 138, and the other end is connected to L1 through normally closed contacts 88C1, fuse 102 and switch 100. One end of a sixth accelerating relay coil 160 is connected to terminal 138, and the other end is connected to L1 through normally closed contacts 90C1, fuse 102 and switch 100. Relays 156, 158 and 160 may be Type CR–2820–1054–B–24 manufactured by General Electric Company and timed to close the contacts about one second after the relay coil is deenergized.

Assuming that the transfer car 12 is loaded at the piler location on rail segment 32A1, that the operator has placed the yard selector switch 126 up to move the car forward to yard No. 2, and the piler has moved low enough not to damage the car so that the piler limit switch 140 is closed, the car is ready to move. When switches 34, 40, 100 and 106 are closed, and master switches 94 and 96 are turned to their off position, relays 98, 108, 112 and 146 will be energized. The spring loaded shunt brake is applied and the dynamic brake resistance 54 is connected across the motor armature 64. The operator at station 10 now moves his master switch 94 to the first forward position. In this position the shunt brake is released by solenoid 76. Movement to position 2 disconnects first dynamic brake 58. Movement to the third position disconnects second dynamic brake 56 and begins the accelerating relay sequence.

The accelerating relay sequence begins by deenergizing relay 156, which after a delay of about one second energizes relay 88, shorting out resistance 38B. Energizing relay 88 deenergizes relay 158 which, after a delay of about one second, energizes relay 90, shorting out resistance 38C. Energizing relay 90 deenergizes relay 160 which, after a delay of about one second, energizes relay 92, shorting out resistance 38D. This is a conventional motor acceleration system. The acceleration cycle is usually completed by the time the transfer car moves off collector rail segment 32A1, which we have found operates satisfactorily when segments 32A1 are about eight feet long.

As the car moves to segment 32A2 relay 116 is now energized, but this has no effect on the operation of the car since contacts 116C are only active when the car moves in the opposite or reverse direction. The transfer car operates satisfactorily when segment 32A2 is about ten feet long.

When the car reaches segment 32A3 relay 118 is energized. Contact 118C1 is only effective during reverse movement of the car. Contact 118C now bypasses piler limit switch 140 so that the piler may now begin to operate independent of the piler limit switch as the car continues to move forward. The transfer car operates satisfactorily when segment 32A3 is about 20 feet long.

When the car reaches segment 32A4 relay 120 is energized, but contacts 120C are not active in the forward direction.

When the car reaches segment 32A5, the longest segment of the collector rail 32A, relay 122 is energized, but contacts 122C and 122C1 are not active in the forward direction.

When the car passes from segment 32A5 to 32A6, control passes from the operator at station 10 to the operator at station 18. Relays 112, 116, 118, 120, 122 and 146 are deenergized. It is necessary now for the operator at station 18 to place his master switch 96 on the third forward position for the car to continue its forward motion uninterrupted. If the master switch 96 is in the second position forward, the car will slow down because the accelerating relays will be deenergized and the second dynamic brake applied. If the switch is in the first position forward the car will slow down because the accelerating relays will be deenergized and the first and second dynamic brakes applied. If the master control switch 96 is in the reverse position, either first, second or third positions, the relays 52, 44, 46 and 98 will become deenergized, the shunt brake will be applied, and the car will come to a stop. When the collector shoe 86 contacts segment 32A6, and, assuming the second storage yard will be used, relays 114, 128, 130, 136, 142 and 144 will be energized.

When the collector shoe 86 moves from rail segment 32A5 to 32A6, the action of relay 146 is delayed about one half second after the coil is deenergized. This allows sufficient time for relay 98 to be deenergized if the master switch 96 is not in proper position.

Relays 148 and 150 are now energized, changing control of the car through master switch 94 at station 10 to control through master switch 96 at station 18. In addition, limit switches 140 and 154 are bypassed so as not to effect operation of the piler while the car is under control of master switch 96 at station 18. As the car moves to segment 32A6 relays 132 and 134 become energized, but their contacts are not active when the yard selector switch 126 is in the down position. When the car reaches segment 32A7 relay 134 is deenergized.

When the car reaches segment 32A8 relay 132 is deenergized and relays 128 and 130 are energized. When the car reaches segment 32A9, relays 130 and 142 are deenergized, which drops out the accelerating relays, slowing down the transfer car. When the car reaches segment 32A10, relays 128 and 136 are deenergized, relays 52 and 46 drop out, dynamic braking through relay 56 is applied, and the shunt brake is applied, bringing the car to a stop.

The car operates in the same manner in the reverse direction. It may be started from rail 32A10 or 32A8. The shunt brake is released on the first master switch position, the first dynamic brake is released on the second master switch position, and the second dynamic brake is released and the accelerating resistances cut out on the third master switch position. Relays 128, 130, 132, 134, 136 and 142 are not effective in a reverse direction. When the car reaches segment 32A6, master switch 94 must be properly placed or the car will slow down or stop when crossing to segment 32A5 in the same manner as crossing from one segment to the other in the forward direction. When the car leaves segment 32A6, relays 114, 128, 130, 136, 142, 148 and 150 are deenergized.

When the car reaches segment 32A5 relays 122, 120, 118, 116, 112 and 146 are energized, and control of the car passes from master switch 96 to master switch 94.

When the car reaches segment 32A4 the car will stop unless piler limit switch 154 is closed. This switch 154 is open only if the piler is so low that it may be damaged by the approaching transfer car. When the car reaches segment 32A3 relay 120 is deenergized, dropping out the accelerating relays. As the car approaches segment 32A2 relay 118 drops out, which applies both dynamic brakes. When the car reaches segment 32A1 directional relays 48 and 50 drop out, the shunt brake is applied and the car comes to a stop. Other conventional control features such as antiplugging, jogging and indicating devices may obviously be added to the transfer car control system by one familiar with transfer car control systems.

The fail-safe feature of our control circuit is the use of series relays in series with the shunt field to control the motor. If the relay 108 drops out, the motor stops. If other of the series relays drop out due to an open circuit, the car will stop. If any of the series relays are short circuited, the car may slow down or stop. For example, assume the car is moving in a reverse direction, toward segment 32A5 or 32A4 and relay 120 fails. If the failure is an open circuit, the car will stop as soon as rail segment 32A5 is contacted. If relay 120 is short circuited, the car will slow down as soon as segment 32A5 is contacted because the accelerating relays will be dropped out. Another fail-safe feature of our control circuit is the interlocking for the master switch positions, which requires identical positioning before a car can cross position 16 between segments 32A5 and 32A6 without interrupting car movement. Still another fail-safe feature is that the failure of any one of fuses 80, 84, 60, 110, 102 and 104 will stop the transfer car.

Although we have illustrated our fail-safe control system by the use of conventional current type relays, our invention is readily adaptable to the use of static current devices thereby eliminating contacts and coils from the maintenance of the control system.

While one embodiment of our invention has been shown and described, it will be apparent that other adaptations and modifications may be made.

We claim:

1. A fail-safe remote control system for a transfer car comprising a drive motor mounted on said car, a field winding for said motor, a first collector shoe mounted on said car and connected to one end of said field winding, a second collector shoe mounted on said car and connected to the other end of said field winding, a first collector rail mounted adjacent the path of travel of said rail and adapted to be contacted by said first collector shoe, said first collector rail including a plurality of electrically isolated segments, a plurality of continuous collector rails one being contacted by said second collector shoe, means connecting the other continuous collector rails to said motor, a source of direct current power, motor control means at a location remote from said transfer car and connected to said power source and to said continuous collector rails, a plurality of current sensitive devices each connected across adjoining collector rail segments, and position sensing means connected to said current sensitive devices, to terminal segments of said segmented collector rail and to said motor control means, said position sensing means being responsive to sequential energizing and deenergizing of said current sensitive devices as said first collector shoe moves past collector rail segments to control operation of said car at each rail segment.

2. A control system according to claim 1 wherein said motor field winding is a shunt field winding, said current sensitive devices are current sensitive relays, and said motor control means includes accelerating means, a shunt brake, a first dynamic brake, a second dynamic brake, a forward directional control means, and a reverse directional control means.

3. A control system according to claim 2 which includes means to interrupt movement of said transfer car when a current sensitive relay coil is short circuited, and means to interrupt movement of said transfer car when a current sensitive relay coil is open-circuited.

4. A control system according to claim 2 which includes a limit switch connected to said motor control means to prevent said transfer car from approaching a fixed location associated with a particular rail segment, said limit switch being actuated by equipment operating in said fixed location hazardous to the movement of said transfer car in said fixed location, and means responsive to said position sensing means to by-pass said limit switch when said first collector shoe has moved away from said particular rail segment.

5. A control system according to claim 2 wherein said position sensing means includes means to disconnect said accelerating means when said first collector shoe contacts the third segment away from either end of said segmented rail, means to apply said first and second dynamic brakes when said first collector shoe contacts the segment between the previously contacted segment and the adjacent end segment, and means to apply said shunt brake and disconnect said directional control means when said first collector shoe contacts the adjacent end segment.

6. A control system according to claim 2 wherein said position sensing means includes means to disconnect said accelerating means when said first collector shoe contacts the second segment away from either end of said segmented rail, and means to apply said shunt brake, said first dynamic brake and to disconnect said directional control means when said collector shoe contacts the end segment adjacent said previously contacted segment.

7. A control system according to claim 2 wherein said segmented collector rail is divided into a first part and a second part and separated by a transfer point, said motor control means includes a first and a second manually operated master control switch with switch positions to control said directional control means, said shunt brake, said dynamic brakes and said accelerating means, means to activate said first master switch when said first collector shoe contacts said first part of said segmented rail, mean to activate said second master switch when said first collector shoe contacts said second part of said segmented rail and means to interrupt the movement of said transfer car at said transfer point if said master control switches are not on identical positions.

8. A control system according to claim 7 wherein said position sensing means includes means to disconnect said accelerating means when said first collector shoe contacts the third segment away from either end of said segmented rail, means to apply said first and second dynamic brakes when said first collector shoe contacts the segment between the previously contacted segment and the adjacent end segment, and means to apply said shunt brake and disconnect said directional control means when said first collector shoe contacts the adjacent end segment.

9. A control system according to claim 8 wherein said position sensing means includes means to disconnect said accelerating means when said first collector shoe contacts the second segment away from either end of said segmented rail, and means to apply said shunt brake, said first dynamic brake and to disconnect said directional control means when said collector shoe contacts the end segment adjacent said previously contacted segment.

10. A control system according to claim 9 which includes a limit switch connected to said motor control means to prevent said transfer car from approaching a fixed location association with a particular rail segment, said limit switch being actuated by equipment operating in said fixed location hazardous to the movement of said transfer car in said fixed location, and means responsive to said position sensing means to by-pass said limit switch when said first collector shoe has moved away from said particular rail segment.

11. A control system to claim 10 which includes means to interrupt movement of said transfer car when a current sensitive relay coil is short circuited, and means to interrupt movement of said transfer car when a current sensitive relay coil is open-circuited.

12. A control system according to claim 11 which includes means to select a segment between said end segments wherein said position sensing means responds to said selected segment in the same manner as an end segment.

References Cited
UNITED STATES PATENTS 904,789 11/1908 Libby.
2,822,929 2/1958 Kruzic.

ARTHUR L. LA POINT, Primary Examiner

G. H. LIBMAN, Assistant Examiner

U.S. Cl. X.R.
104—149; 318—266